United States Patent [19]
Johnston et al.

[11] Patent Number: 5,381,245
[45] Date of Patent: Jan. 10, 1995

[54] X-RAY FILM SCANNING AND DIGITIZING APPARATUS

[75] Inventors: Gregory E. Johnston, Palos Verdes; Byron D. Wagner, Studio City; Lloyd Hes, Whittier, all of Calif.

[73] Assignee: X-ray Scanner Corporation, Torrance, Calif.

[21] Appl. No.: 46,165

[22] Filed: May 20, 1993

Related U.S. Application Data

[63] Continuation of Ser. No. 467,030, Jan. 18, 1990, Pat. No. 5,241,406.

[51] Int. Cl.6 .............................................. H04N 1/04
[52] U.S. Cl. ..................... 358/487; 358/474; 358/475; 358/497
[58] Field of Search ............... 358/497, 487, 464, 461, 358/474, 475

[56] References Cited

U.S. PATENT DOCUMENTS

| | | | |
|---|---|---|---|
| 3,526,459 | 5/1968 | Elmer | 355/67 |
| 3,687,538 | 8/1972 | Matsumoto | 355/3 |
| 3,953,125 | 4/1976 | Bost | 355/101 |
| 4,500,197 | 2/1985 | Dannatt | 355/8 |
| 4,702,593 | 10/1987 | Detsch | 355/77 |
| 4,800,287 | 1/1989 | Green et al. | 250/560 |
| 4,943,870 | 7/1990 | Sugishima | 358/474 |
| 4,989,099 | 1/1991 | Koshiyouji et al. | 358/487 |
| 5,241,406 | 8/1993 | Johnston et al. | 358/497 |

*Primary Examiner*—Edward L. Coles, Sr.
*Assistant Examiner*—Thomas D. Lee
*Attorney, Agent, or Firm*—Robert E. Malm

[57] ABSTRACT

A conventional flat bed greyscale digitizing scanner which operates in conjunction with reflective media is retrofitted with an adapter assembly which permits it additionally to process X-ray film transparencies. Accordingly, the resulting apparatus, in addition to performing digitization of data imprinted on reflective media, is also capable of digitizing X-ray images on X-ray film transparencies. The adapter assembly is constucted to be easily mounted on a conventional flat bed scanner to permit the scanner to process the film transparencies, and to be easily removable from the conventional scanner to permit the scanner to operate in a conventional mode to process reflective media. The scanner may be constructed to perform transparency digitization and to provide an optical density dynamic range greater than the prior art CCD technology used in the more expensive machines will allow.

3 Claims, 4 Drawing Sheets

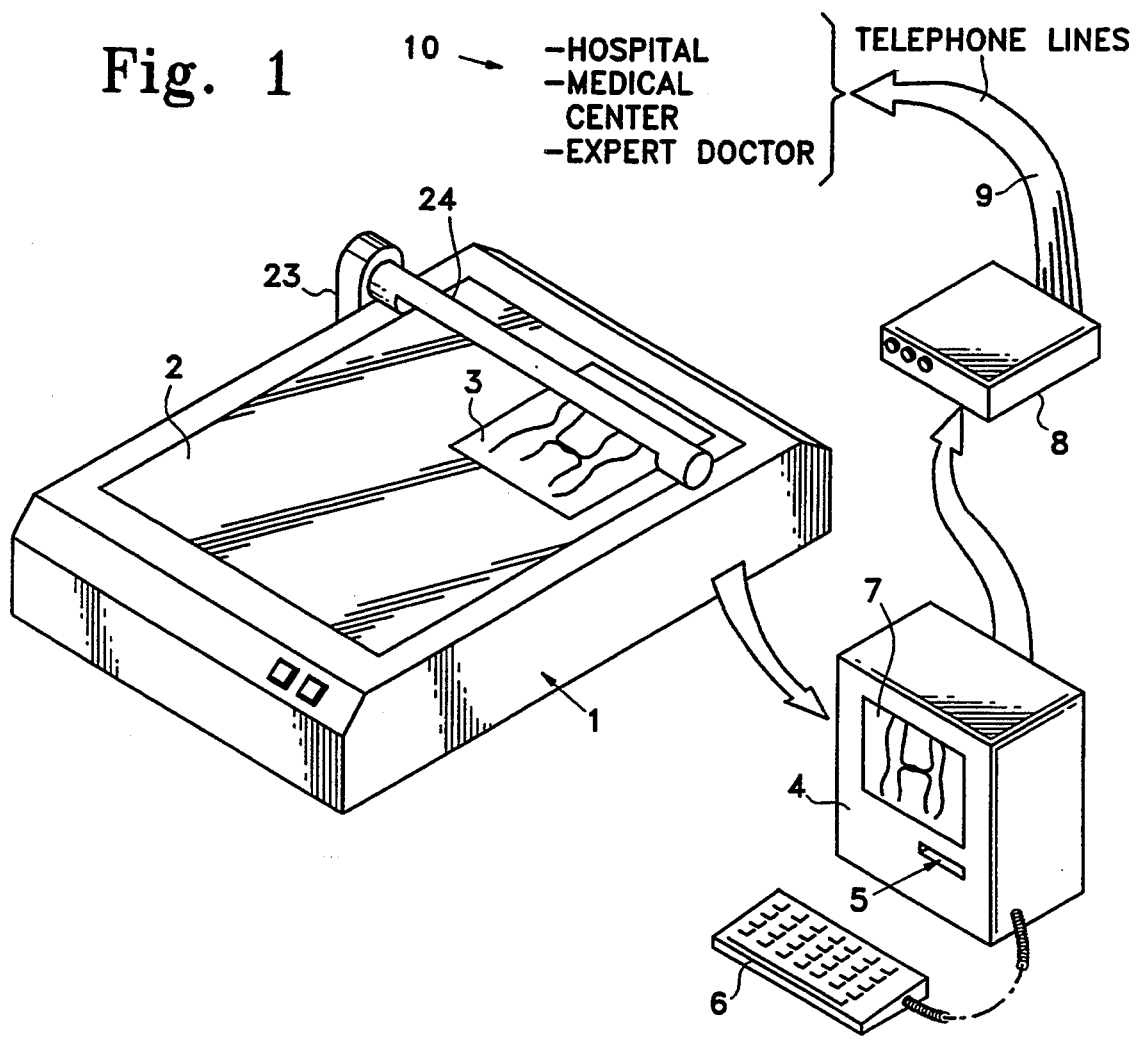
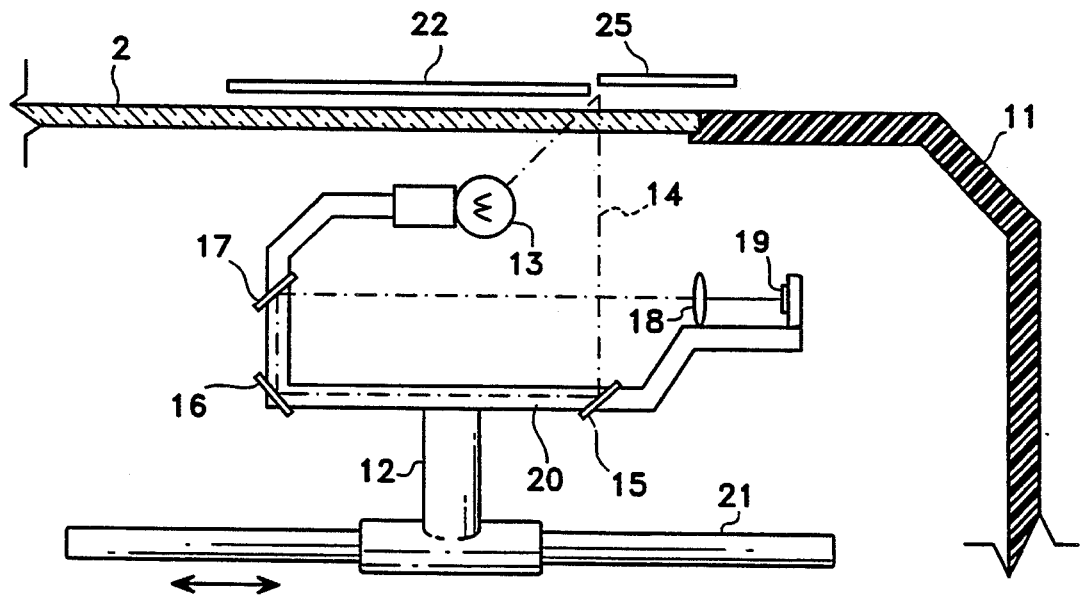

X-RAY FILM SCANNING AND DIGITIZING APPARATUS

This application is a continuation of application Ser. No. 07/467,030, filed Jan. 18, 1990, now U.S. Pat No. 5,241,406.

BACKGROUND OF THE INVENTION

Greyscale flat bed digital scanners are well known to the art. One such scanner using a charge coupled device (CCD) sensor is illustrated and described, for example, in U.S. Pat. No. 4,500,197. Such apparatus optically scans documents on which data is imprinted on reflective media. The documents are placed face down on a transparent top and are optically scanned by a scanner located within the apparatus under the transparent top. The resulting data is digitized in the prior art apparatus and computer processed for transmission, for example, over telephone lines.

The prior art flat bed digital scanners use light sensitive detectors to measure the reflected light level from the scanned document, such as a photograph, printed matter, magazine page, or the like. Such light sensitive detectors use a technology known as Charge Couple Device (CCD), and serve to quantitize the data in a format suitable for computer processing to be reproduced by peripheral equipment such as a monitor and/or printer, or to be transmitted to remote locations over the telephone lines by appropriate MODEMs.

As mentioned above, the prior art flat bed scanners operate in conjunction with reflective opaque media and the prior art scanners operate by directing an optical beam to the under surface of such media to be reflected by the data imprinted thereon.

The present invention provides an assembly which may be removably mounted on a prior art flat bed scanner to enable the scanner additionally to process data imprinted on transparent media, such as X-ray films. This concept enables inexpensive flat bed digital scanners to be used to scan and digitize data on X-ray films for local reproduction and/or for transmission to remote points.

It has been usual in the prior art to digitize X-ray films by relatively complex and expensive equipment. Such equipment uses photosensitive detectors and precision positioning mechanisms to provide a wide dynamic range of optical density (greyscale) and to maintain accurate spacial representation.

As mentioned above, the present invention enables low cost digitizing flat bed scanners to be used for the same purpose as the more expensive prior art equipment described in the preceding paragraph. As will be described, such low cost flat bed digital scanners may be constructed to perform transparency digitization and to provide an optical density dynamic range greater than the prior art CCD technology used in the more expensive prior art machines will allow.

The optical scanner utilized in the apparatus of the invention is a charge coupled device (CCD sensor) which is used in place of the more bulky conventional optics found in other prior art document scanners. The prior art has typically demonstrated the use of the combination of lens optics and mirrors in order to achieve translation of the image of an illuminated object placed on a document platen glass to an imaging station where the image is exposed into a sensitized photoconductor.

The application and use of the CCD sensor as a scanner provides a way to reduce dimensional space requirements taken up previously by prior art optical scanning apparatus, because of the relatively small size of the CCD sensor assembly. The means of reducing the scanner size is demonstrated in the system described in U.S. Pat. No. 4,500,197. The system of the invention, when combined with other new electronic technology, allows the image of the source material to be processed and developed in different efficient ways. For example, the resultant image may be converted into a train of electronic pulses which are reconstructed on the screen of a cathode-ray tube which may be remotely situated. The images may then be projected directly onto a photoconductor surface where conventional copier processes are used for image development and for transfer of the image onto copy paper.

A typical CCD scanner is partially comprised of a scanner assembly having an optical path with dual mirrors which are arranged compactly so that multiple reflections are generated between the two mirrors. There may be typically six reflections of an image between the two mirrors which necessitates maintaining a strict unyieldable structural relationship between the two mirrors. The need for a rigid vibration-free relationship between the CCD scanner and the mirrors becomes especially critical during translating motion of the scanner carriage.

A solution of certain problems relating to obtaining a direct illuminated image by adjusting the CCD lens unit to the cooperating, compactly arranged mirrors, without physically adjusting the mirrors has been demonstrated in the prior art. Avoidance of disturbing this particular mirror arrangement is highly desirable because of the inherent difficulty in aligning and rigidly holding mirrors designed and intended to generate multiple reflections. These difficulties are greatly compounded because of the mounting of the mirrors in a carriage which is slidably mounted on rails and supported in structure comprising the framework of a machine which has other mechanisms additionally mounted to such framework thereby causing various vibrations or shocks which could adversely affect the reproduction of an image.

An objective of the present invention is to enable a conventional prior art flat bed greyscale and color digitizing scanner to retain its normal feature of digitizing data imprinted on reflective medium by providing a mechanism that will allow the detector electronics of the scanner to recalibrate the mechanism for use in conjunction with X-ray transparencies and the like. It is the nature of the photosensitive detector charge coupled device (CCD) that each detector must be calibrated prior to use. This is due in part to the imperfect nature of the manufacturing process for each detector cell that contributes to an uncertain output.

To overcome the above-mentioned drawback, a common technique in the prior art is to stimulate the detectors prior to scanning with a different reference source. This reference source in the prior art reflective-type scanners is in the form of a white strip that uniformly reflects the excitation light to the detector electronics such that the CCD output can be measured. This measurement then becomes an equalizing reference and establishes the compensation value for the CCD array of detector cells during normal operation of the scanner in conjunction with reflective type media.

The present invention provides an additional reference strip which is used in a second mode of operation of the scanner during which it is processing data on transparent media, such as X-ray films, so as to calibrate the CCD array prior to scanning X-ray films or other transparencies.

Another objective of the invention is to provide a system for use in the conventional CCD detector based flat bed scanner to achieve greater optical density sensitivity dynamic range by improving the detector electronics so as to provide programmable photon integration periods. Such system provides dynamic control of the detector exposure time to enable the CCD to achieve a wider range of sensitivity and thereby significantly improve performance.

SUMMARY OF THE INVENTION

The invention provides an adapter assembly which may be removably mounted on a conventional flat bed greyscale digitizing scanner to permit the scanner additionally to process X-ray film or color transparencies. The adapter assembly of the invention is constructed to be easily mounted on the prior art flat bed scanner to adapt the scanner to process X-ray film transparencies, and to be easily removable from the prior art scanner to permit the scanner to operate in a conventional mode and process data imprinted on usual reflective media.

BRIEF DESCRIPTION OF THE DRAWINGS

FIG. 1 is a perspective representation of a conventional prior art flat bed digitizing scanner including an adapter assembly for enabling the scanner to process film transparencies, and illustrates the scanner as being coupled to a computer system for digitizing and processing the data from the scanner;

FIG. 2 is a side sectional view of a portion of the conventional scanner of FIG. 1 with the adapter assembly removed;

DETAILED DESCRIPTION OF THE ILLUSTRATED EMBODIMENT

Figure 3:
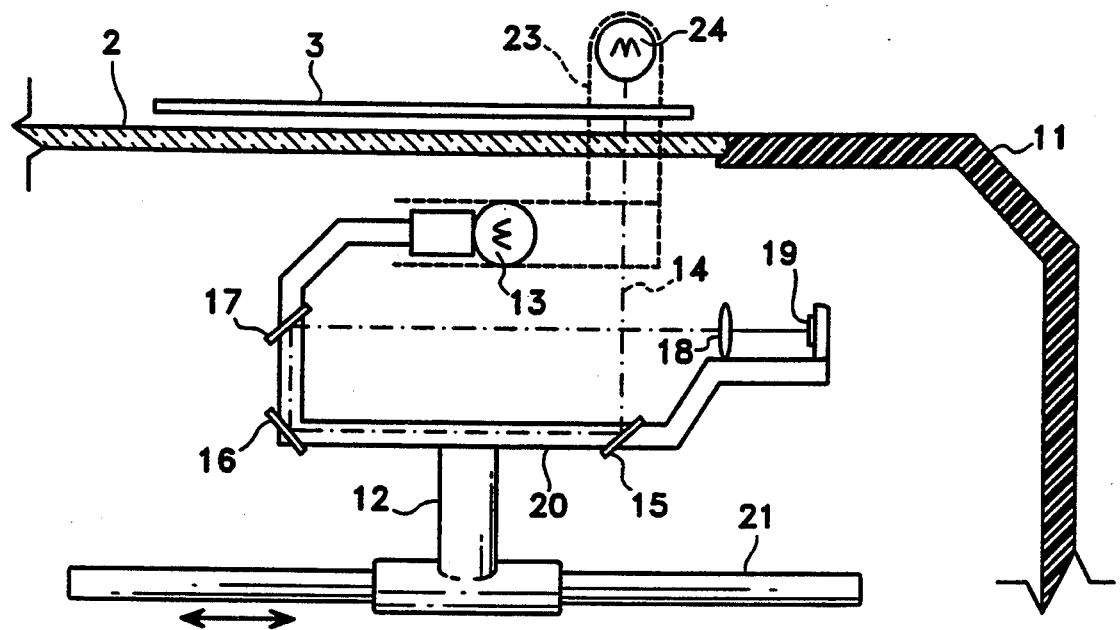
FIG. 3 is a side section of a portion of the scanner of FIG. 1 with the adapter assembly in place.

The overall system shown in FIG. 1 includes a conventional flat bed scanner 1 having a transparent top 2 which allows an appropriate scanning mechanism positioned within the scanner under the transparent top to scan an image of reflective medium placed face down on the transparent top. In accordance with the present invention, an adapter assembly 23, 24 is mounted on the flat bed scanner 1 to permit the scanner to scan transparencies, such as an X-ray film transparency 3 which is placed on the transparent top 2.

The flat bed scanner 1 of FIG. 1 in one mode scans and digitizes data on a reflective medium which is placed face down on the transparent top, and in a second mode scans and digitizes transparencies, such as the X-ray transparency 3, and transmits the data to a computer 4. The operator can enter commands for the flat bed scanner 1 into the computer by way of a keyboard 6 to select scanning modes and areas as well as manipulation operations that can be performed on the resulting images displayed on a monitor 7. Once data from the reflective medium or from the X-ray transparency has been scanned and digitized, the image may be evaluated with computer enhancement software programs, or transmitted to a remote location by way of a MODEM 8 which operates over telephone lines 9. Transfer of the data from the reflective media, or of X-ray data from the X-ray film transparencies can be transferred in this manner to off-site medical centers, hospitals, or expert doctors, designated by the numeral 10.

As mentioned above, a conventional flat bed digitizing scanner is shown in FIG. 2. As shown in FIG. 2, the apparatus 1 includes a housing 11, which supports the transparent top 2. A reflective medium 22 is placed face down on the transparent top 2, so that data imprinted on the medium may be scanned by an appropriate scanning mechanism supported within the housing 11. The scanning process is initiated by the activation of an excitation light bulb 13. Light from the light bulb 13 follows an optical path 14 which initially reflects through the transparent top 2 from the underside of the medium 22. The light then enters a mirror system 15, 16, 17 which directs the light into a focusing lens 18. Focused light from lens 18 illuminates appropriate detector electronics and thereby places a thin transverse line of reflected light from media 22 across the length of a photon sensitive array 27 within the detector 19.

The excitation light bulb 13, mirror system 15, 16, 17, focusing lens 18 and detector electronics 19 are all supported by a mechanical frame 20 and transport mechanism 12 which guides the scanning mechanism along a precision transport guide shaft 21. The medium 22 is digitized one spot at a time along its width by the detector electronics 19, and then the frame 20 is advanced the width of the spot size to the next transverse line across medium 22 and the process is repeated. The procedure continues until the length of the medium 22 is scanned by the apparatus.

Without further adaptation, the prior art mechanism shown in FIG. 2 operates only in conjunction with reflective media, such as medium 22. This is because X-ray transparencies allow light to pass through them so that even if a mirror were placed above the transparency to redirect light back into the optical path 14, a negligible level of protons would reach the detector electronics 19. In addition, the geometry of the optical path 14 would enter the X-ray transparency at one point and pass through the transparency to be reflected back at a different point, so that the resultant light energy would be influenced by two sections of the transparency and would therefore represent an uncertain measure of the data recorded on the transparency.

The apparatus of FIG. 3 represents the mounting of the removable module of the invention on the apparatus of FIG. 1. The module of the invention includes an upper excitation bulb 24 and a support frame 23. When the scanning mechanism is in its conventional reflective mode, such as shown in FIG. 2, the upper excitation bulb 24 and its support frame 23 are removed to allow the lower bulb 13 to provide the optical path 14 with light energy, as described in conjunction with FIG. 2.

In order to adapt the scanner to function in conjunction with X-ray transparencies 3 placed on the transparent top 2, the module of the invention is mounted on the scanner, as shown in FIG. 3. The support frame 23 for the upper bulb 24 is mounted on the mechanical frame 20, as shown in FIG. 3, so that the upper bulb scans across the transparency 23 when the apparatus is activated. At the point of mechanical interface of the support frame 23 and the mechanical frame 20, microswitches are mounted to disengage the power supply from the lower light bulb 13 and to cause the power supply to energize the upper light bulb 24. The upper light bulb 24 then emits light energy which is directed through the X-ray transparency 13 to be directed along the light path 14 in the same manner as light was directed in the operational mode of FIG. 2.

Accordingly, when the adapter module of the invention is removed from the unit 1 of FIG. 1, the unit operates in a conventional manner, as shown in FIG. 2, so that data on an opaque reflective media 22 may be scanned and processed by electronics 19 to produce appropriate digital signals which are utilized by the computer 4 of FIG. 1. On the other hand, when the-module of the invention is mounted on the unit 1 of FIG. 1, light bulb 24 is caused to scan film transparency 13 to produce the same modulated light along optical path 14 for processing by electronics 19.

Figure 4:
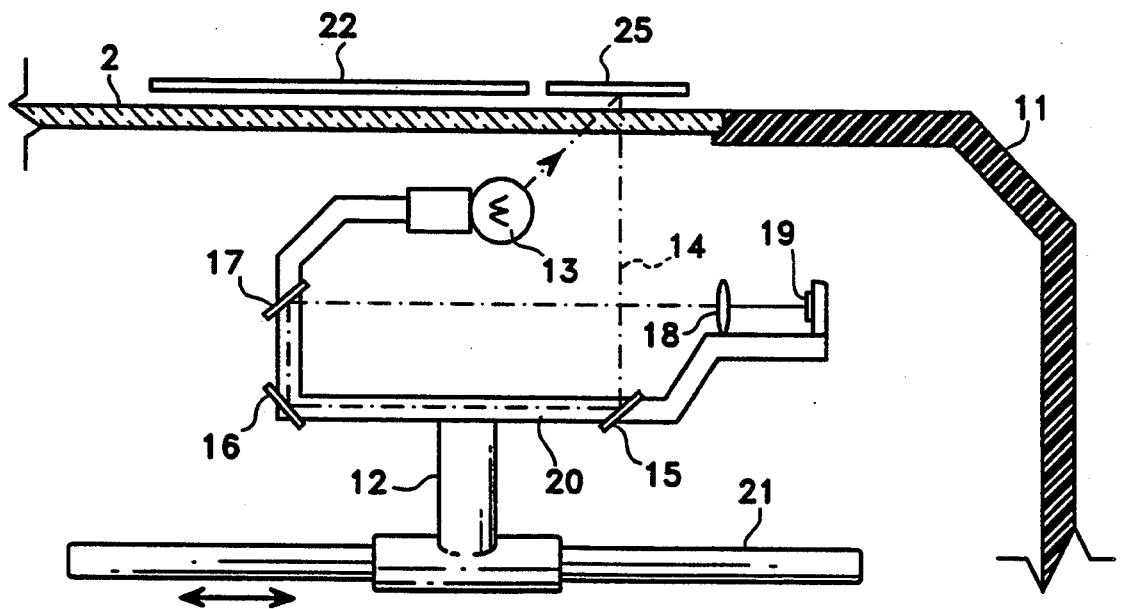
FIG. 4 is a side section of a portion of the adapter of FIG. 1 showing the manner in which the CCD array of detector cells in the conventional scanner may be calibrated for reflective material.

The representation of FIG. 4 shows the manner in which the CCD light sensitive detectors of the usual prior art flat bed scanner of FIG. 2 are calibrated. In accordance with the usual prior art procedure, the typical CCD has its individual light sensitive detectors calibrated and equalized prior to scanning. Each detector cell in the detector electronics 19 has individual characteristics in relation to the amount of electric potential generated in proportion to the amplitude of light energy incident on the particular cell. For that reason, it is necessary to calibrate the individual cells prior to its actual operation. To accomplish calibration, an equal amount of light energy is presented to all the detector cells in the detector electronics 19. For that purpose, bulb 13 is activated and light energy passes through glass top 2 of the flat bed scanner 1 and is reflected from a uniform white strip 25 having a width corresponding to the width of the maximum scanning area. The light energy reflected from white strip 25 follows the optical path 14 to detector electronics 19 where each detector cell is measured and an equalizing constant is calculated and stored for future adjustments to the outputs of the detector electronics 19 during actual operation of the machine.

Figure 5:
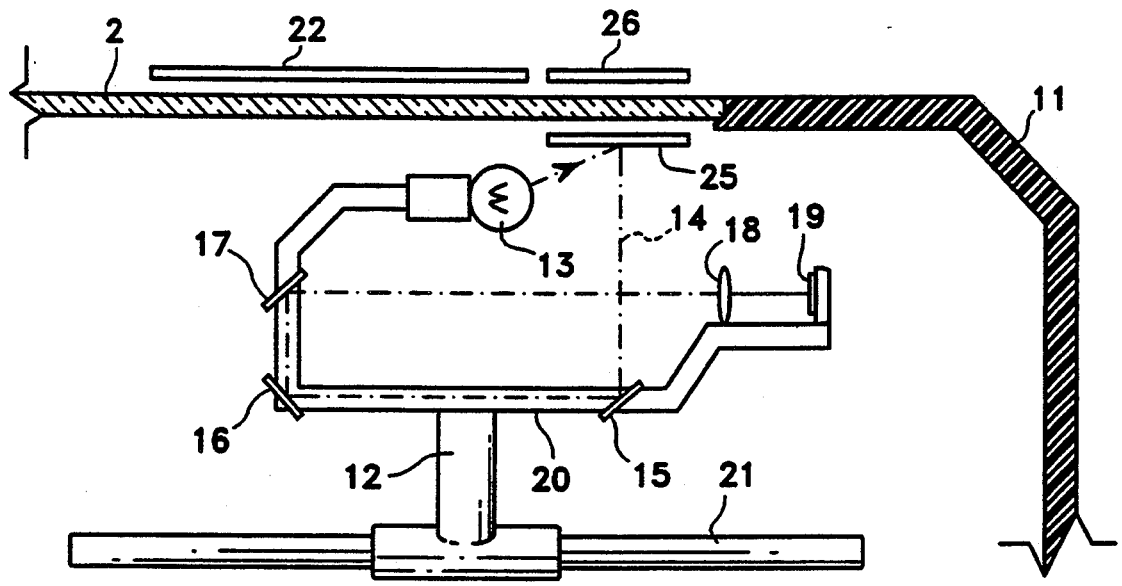
FIG. 5 is a sectional view of a portion of the scanner in FIG. 1 showing the manner in which photographs or reflective media processed by the scanner may be calibrated.
Figure 6:
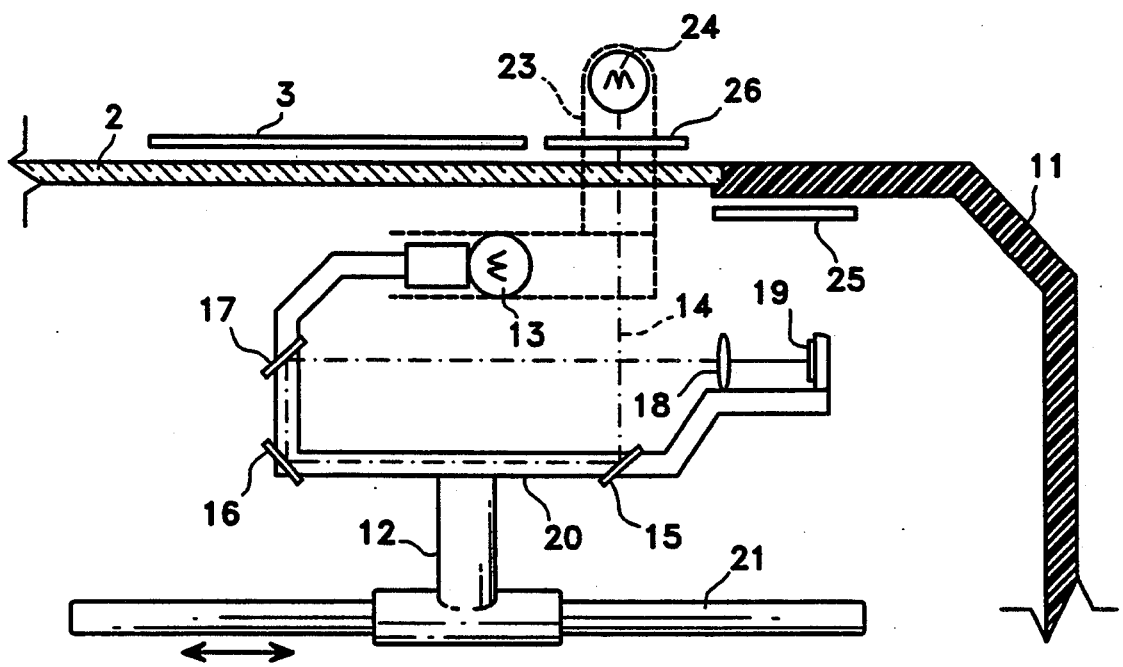
FIG. 6 is a side section, like FIG. 5, but with a calibration strip used for calibrating the film transparencies of the flat bed scanner being displaced.

In the schematic diagrams of FIGS. 5 and 6, a modification is incorporated to enable the same flat bed scanner of FIG. 4 to calibrate the detector electronics 19 when the apparatus is in the film transparency digitizing mode. In the embodiment of FIG. 5, strip 25 is mounted under transparent top 2, and a uniform density transparent strip 26 is mounted above the transparent top. In the embodiment of FIG. 6, the adapter frame 23 is mounted on the support frame 20 of the scanning mechanism, similar to the embodiment of FIG. 3. Appropriate linkage is then activated by the operator to move the reflective strip 25 out of the optic path 14, and to enable the light from the light bulb 13 to pass through the uniform optical density transparency strip 26 along the optical path 14 to the detector electronics 19. The uniform density transparent strip 26 matches the net photon energy received by the detector electronics 19 thereby allowing the flat bed scanner 1 and scanning mechanism to digitize the data on the transparency 3 with appropriate calibration.

Figure 7:
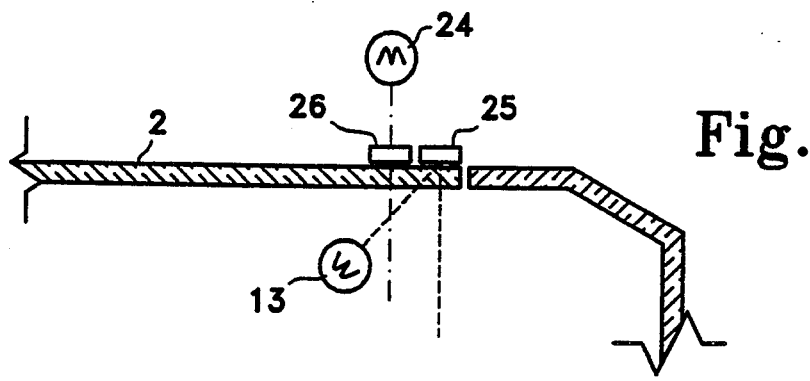
FIG. 7 is a schematic representation showing another calibration technique.

In FIG. 7 the strips 25 and 26 are mounted above the transparent top 2 and they are stationary. To calibrate the CCD appropriate control electronics automatically causes transport mechanism 12 to position strip 25 in the optical path of lamp 13 when that lamp is energized and the apparatus is operating in its first mode, and to position strip 26 in the optical path of lamp 24 when that lamp is energized and the apparatus is operating in the second mode. This removes the need for the operator to select the calibration strip.

Figure 8:
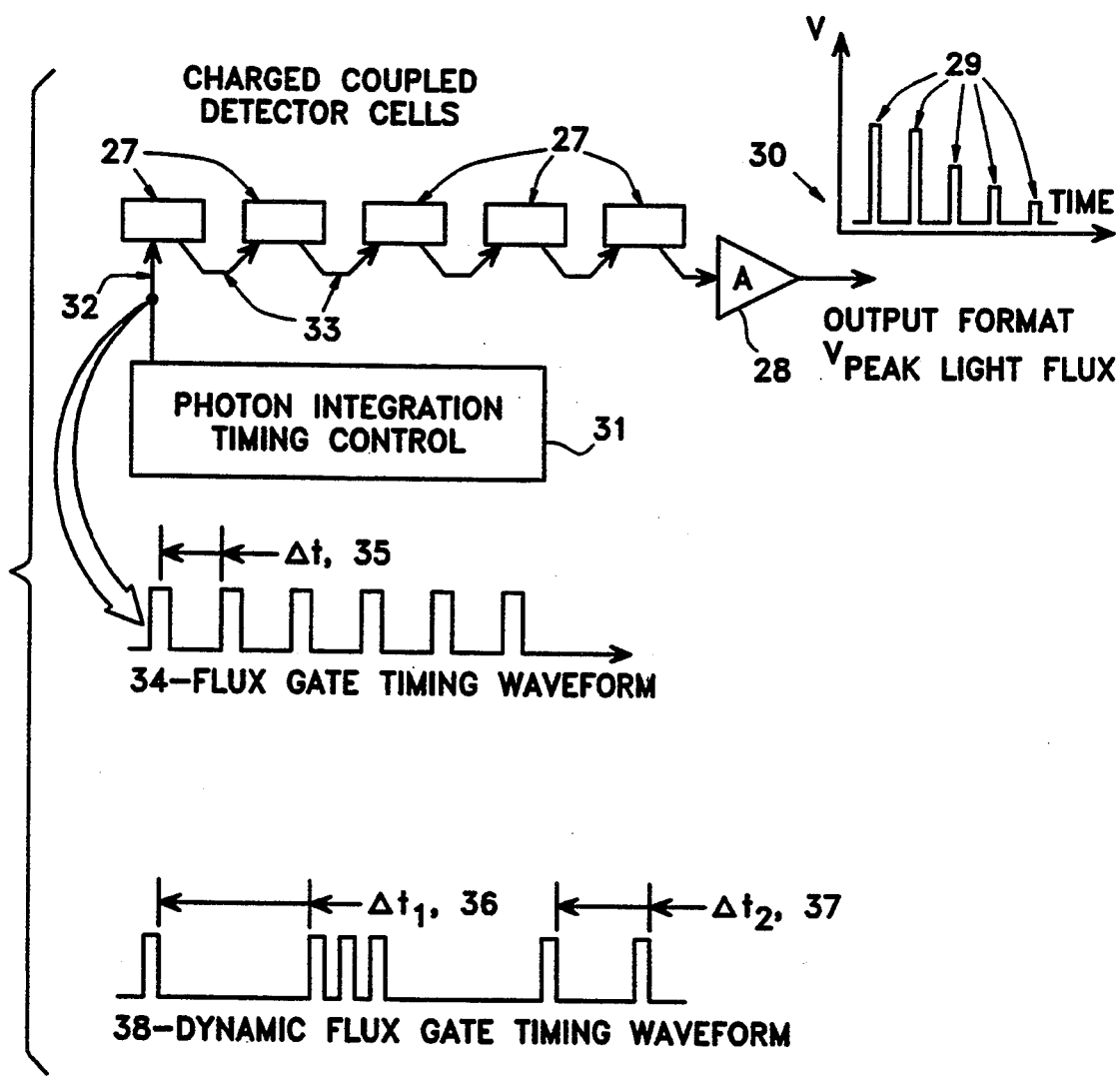
FIG. 8 is a schematic representation of a unique CCD photosensitive detector which may be used in the assembly of the present invention.

In accordance with another aspect of the invention, and as shown in the schematic diagram of FIG. 8, the flat bed scanner itself is caused to achieve greater dynamic range for improving sensitivity by modifying is electrical circuitry and its software program. In the embodiment of FIG. 7, each photosensitive detector cell 27 of the CCD is controlled by an apertured control signal 32 that generates a period of time for which light energy is collected. This period of time is referred to as "photon integration time" and is produced by appropriate control circuitry 31. Each detector cell 27 has a source of minority carriers that generate a potential at each cell 27 proportional to the period of time 35 and level of incident light energy.

In this respect, reference is made to "The Infrared Handbook" Chapter 12, Environmental Research Institute of Michigan, 1978. The charged packet accumulated at each cell 27 can be shifted towards an output sense amplifier 28 by a control signal 32 and a transfer path 33 for each packet to follow. The former art control signal is a fixed period waveform 34 that defines the CCD's aperture. This fixed aperture then establishes a limited dynamic range of the CCD at a particular point whereby the flat bed scanner 1 will operate.

The foregoing provides an improvement of prior art timing circuitry 31 that provides a dynamic timing control 36, 37 for the CCD and thereby expands the aperture range and effective sensitivity of the flat bed scanner 1. In FIG. 7, the flux gate timing waveform is designated 34, and the dynamic flux gate timing waveform is designated 38. The output format of $V_{peak}$ with respect to light flux is designated by pulses 9 in waveform 30.

The invention provides, therefore, an improved flat bed greyscale digitizing scanner which not only may be used in conjunction with data imprinted on reflected media, but which may also be used to scan and digitize X-ray data, and the like imprinted on film transparencies.

It will be appreciated that while a particular embodiment of the invention has been shown and described, modifications may be made. It is intended in the claims to cover all modifications which come within the true spirit and scope of the invention.

We claim:

1. In a flat bed greyscale digitizing scanner which comprises, a housing having a transparent top, a scanning mechanism mounted within said housing, a light source mounted on said scanning mechanism to scan a data-bearing medium positioned on said transparent top, and an electronic detector unit for transforming light into corresponding electric signals, optical elements mounted on said scanning mechanism for transmitting light from said light source to transmit light from said data-bearing medium to said electronic detector unit, the combination of: a support frame mounted on said scanning mechanism to support said light source above said transparent top and to enable light from said light source to pass through a data-bearing transparency to said optical element, a transparent calibration strip of uniform optical density positioned on said transparent top adjacent to said data-bearing medium and a white opaque calibration strip positioned under said transparent top and movable to a position laterally displaced form said transparent top.

2. A flat bed digitizing scanner comprising:
a housing having a transparent top;
a scanning mechanism mounted within said housing, said scanning mechanism being adapted to receive commands that cause said scanning mechanism to move parallel to and scan an area of a data bearing medium positioned on said transparent top;
an adapter assembly having a means if attachment to said scanning mechanism, said adapter assembly including a first light source, the attachment of said adapter assembly to said scanning mechanism resulting in said first light source being positioned above the transparent top of said housing so as to illuminate a data-bearing medium positioned on said transparent top;
a means for converting the light emitted from a data-bearing medium positioned on said transparent top into digital data and making available said digital data at an output port;
a second light source positioned beneath said transparent top and mounted on said scanning mechanism so as to illuminate a data-bearing medium positioned on said transparent top;
wherein the attachment of said adapter assembly to said scanning mechanism prevents said second light source from being energized and allows said first light source to be energized and the detachment of said adapter assembly from said scanning mechanism allows said second light source to be energized and prevents said first light source from being energized.

3. A flat bed digitizing scanner comprising:
a housing having a transparent top;
a scanning mechanism mounted within said housing, said scanning mechanism being adapted to receive commands that cause said scanning mechanism to move parallel to and scan an area of a data bearing medium positioned on said transparent top;
an adapter assembly having a means of attachment to said scanning mechanism, said adapter assembly including a first light source, the attachment of said adapter assembly to said scanning mechanism resulting in said first light source being positioned above the transparent top of said housing so as to illuminate a data-bearing medium positioned on said transparent top;
a means for converting the light emitted from a data-bearing medium positioned on said transparent top into digital data and making available said digital data at an output port;
a second light source positioned beneath said transparent top and mounted on said scanning mechanism so as to illuminate a data-bearing medium positioned on said transparent top;
wherein said light conversion means includes:
detector electronics comprising a photon sensitive detector array;
a first calibration strip made from white opaque material and displaceably positioned beneath the transparent top of said housing, said first calibration strip being used to calibrate the detectors in said detector array when said adaptor assembly is detached from said scanning mechanism, said first calibration strip being laterally displaced from said transparent top when said adapter assembly is attached to said scanning mechanism;
a second calibration strip of uniform optical density positioned on said transparent top above said first calibration strip, said second calibration strip being used to calibrate the detectors in said detector array when said adapter assembly is attached to said scanning mechanism.

* * * * *